(12) United States Patent
Bundy

(10) Patent No.: US 6,511,637 B2
(45) Date of Patent: *Jan. 28, 2003

(54) AIR POLLUTION CONTROL ASSEMBLY AND METHOD

(75) Inventor: Richard P. Bundy, Pickerington, OH (US)

(73) Assignee: Bundy Environmental Technology, Inc., Reynoldsburg, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/293,351

(22) Filed: Apr. 16, 1999

(65) Prior Publication Data
US 2002/0187083 A1 Dec. 12, 2002

Related U.S. Application Data

(60) Provisional application No. 60/082,215, filed on Apr. 17, 1998.

(51) Int. Cl.[7] ............ B01D 46/02; B01D 46/04
(52) U.S. Cl. .............. 422/171; 422/169; 422/170; 422/172; 422/173; 96/275; 55/301; 55/341.1
(58) Field of Search ................. 422/168, 169, 422/170, 171, 172, 173; 55/302, 301, 341.1; 96/228, 275

(56) References Cited

U.S. PATENT DOCUMENTS

| | | | |
|---|---|---|---|
| 3,876,402 A | | 4/1975 | Bundy et al. |
| 3,877,899 A | | 4/1975 | Bundy et al. |
| 4,105,421 A | | 8/1978 | Rheinfrank, Jr. et al. |
| 4,113,449 A | | 9/1978 | Bundy |
| 4,158,554 A | * | 6/1979 | Bundy et al. ............... 55/379 |
| 4,645,652 A | * | 2/1987 | Kimura .................. 423/235 |
| 4,865,828 A | * | 9/1989 | Lerner ................ 423/244.08 |
| 4,980,099 A | * | 12/1990 | Myers et al. ............. 261/116 |
| 5,062,872 A | * | 11/1991 | Williams ................. 55/302 |
| 5,156,658 A | * | 10/1992 | Riehl ..................... 55/128 |
| 5,599,508 A | * | 2/1997 | Martinelli et al. ......... 422/169 |
| 5,649,985 A | * | 7/1997 | Imamura .................. 96/275 |
| 5,676,715 A | * | 10/1997 | Kalka et al. .............. 96/228 |

* cited by examiner

Primary Examiner—Hien Tran
(74) Attorney, Agent, or Firm—Anthony G. Eggink

(57) ABSTRACT

An air pollution control assembly for treating flue gas streams containing acid gases. The assembly is comprised of an evaporative cooler assembly or a spray dryer gas distribution system. The assembly further has a reagent injection venturi assembly and a baghouse assembly. The baghouse assembly includes a filter cake management system which is automatically activated with respect to time and the pressure differential across the filter bags.

16 Claims, 4 Drawing Sheets

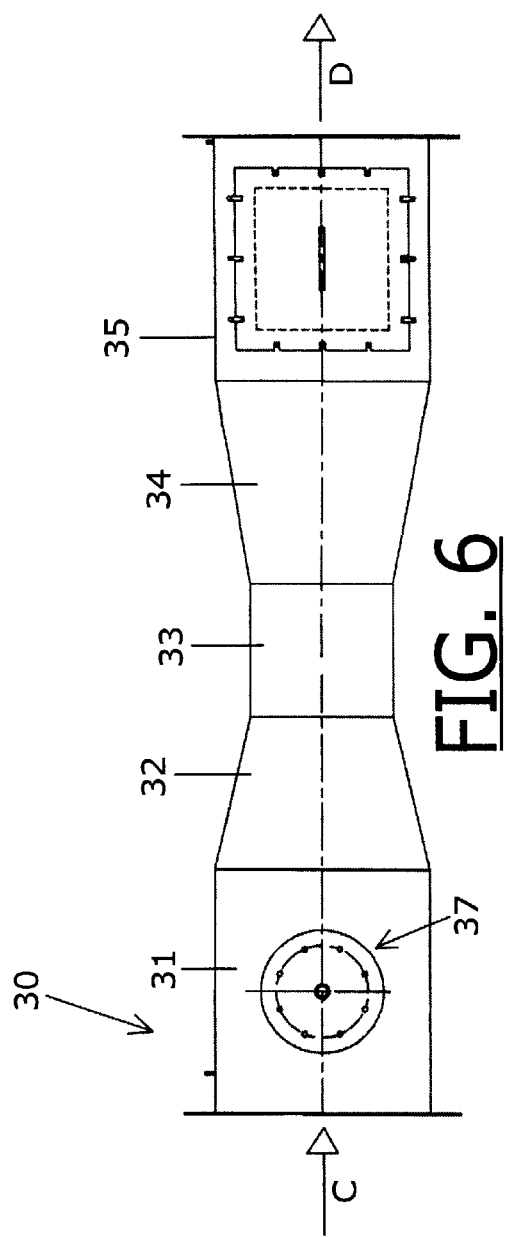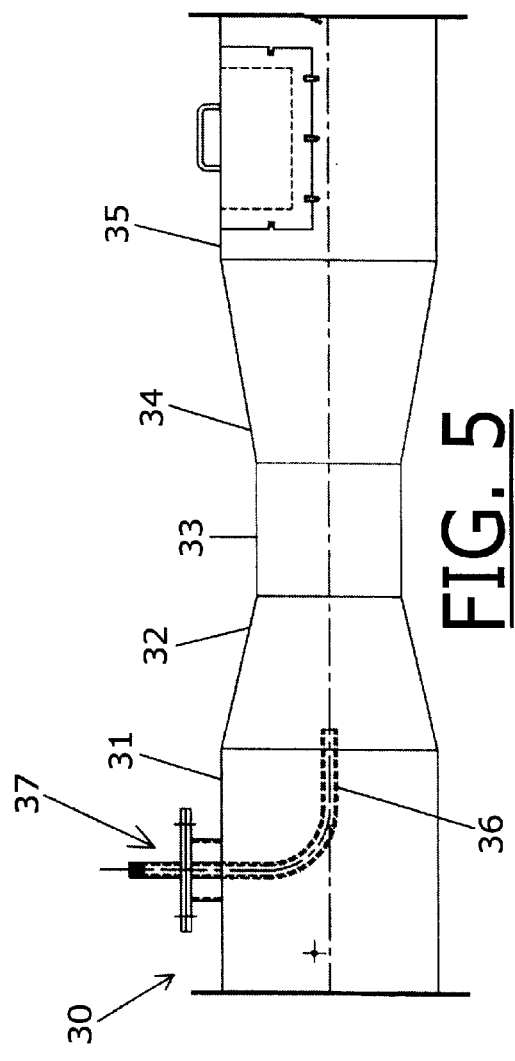

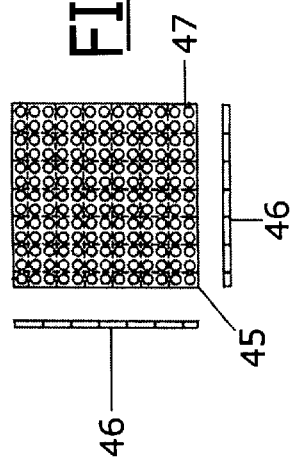
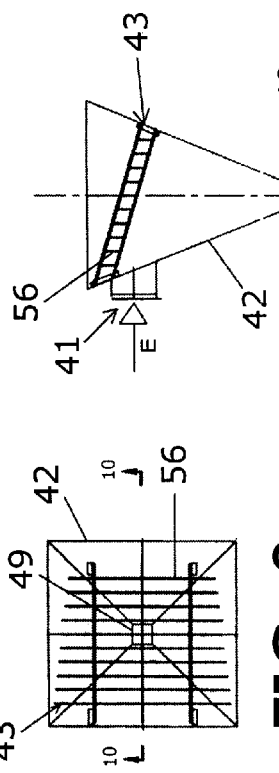
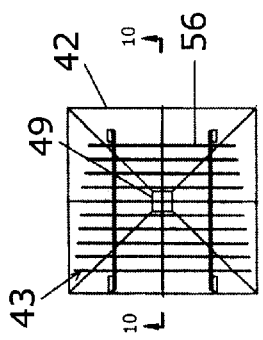
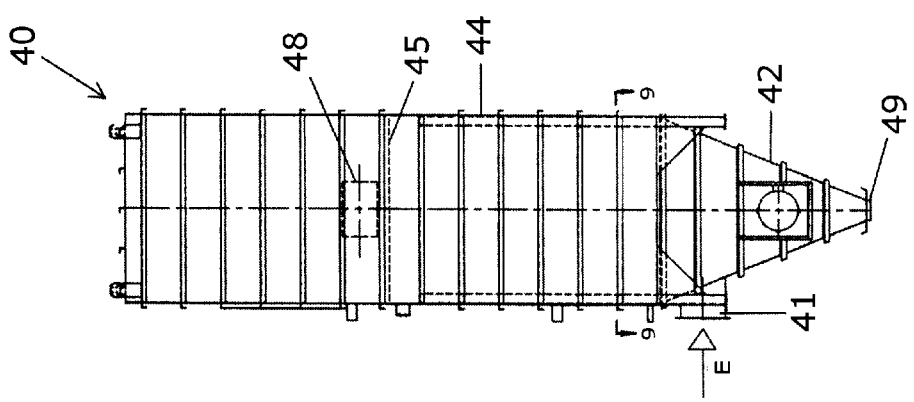
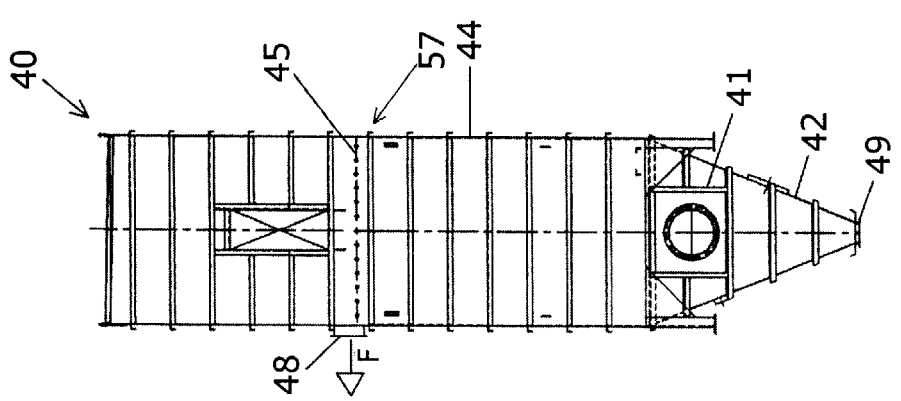

AIR POLLUTION CONTROL ASSEMBLY AND METHOD

This application claims the benefit of U.S. Provisional Application No. 60/082,215, filed on Apr. 17, 1998.

BACKGROUND OF THE INVENTION

The present invention relates generally to air pollution control assemblies and particularly to assemblies and methods which control and treat gas streams to remove pollutants. Particularly, the invention relates to an air pollution control assembly for treating acid gas streams from incinerators and the like. More particularly, this invention relates to a synergistic combination of assemblies to effectively treat polluted gas streams, such as a dry scrubber assembly for removing acid gasses.

In the past, various air pollution control apparatus and methods have been proposed and utilized in treating various flue gas streams. For example, Applicant's U.S. Pat. Nos. 3,876,402, 3,877,899, 4,105,421, 4,113,449 and 4,158,554 disclose apparatus and methods used to filter particulate laden gases. Fabric filtration structures and methods are generally disclosed directing particulate laden gas streams into baghouses. Structures and methods are also disclosed for cleaning filter bags of a baghouse as well as structures arranged to permit filtering elements to be replaced as a unit. These patents provide a background showing air pollution control equipment designs and methods.

Air pollution and environmental quality concerns continue to increase controls on industrial emissions via various laws, statutes, and mandates by regulatory agencies. The separation of undesirable particulate matter from effluent streams by fabric filtration is a method of controlling air pollution. Fabric filtration is performed using dust collection apparatus or baghouses which operate, except for scale, on the principle of vacuum cleaners. A baghouse is typically a sheet metal housing divided into two chambers, or plenums, by one or more tube sheets. Disposed within openings communicating with the plenums are fabric filters. A particle-laden gas stream, induced by a fan, for example, enters one chamber (dirty-air plenum) wherein dust accumulates on the fabric filter as the gas passes through the fabric into the other chamber (clean-air plenum) and out the exhaust. Although baghouses are typically designed in accordance with these principles, there are operational and structural differences between them. The present invention relates to a baghouse wherein the dirty and clean air plenums are separated by a tube sheet having a plurality of vertically suspended filter bags in which cylindrical wire cages are inserted for skeletal support. The gas is filtered as it moves from the outside of the bags to the inside. As a result, baghouses constructed in this manner are normally referred to as outside bag collectors and these outside bag collectors are used in the dry scrubber assembly of the present invention.

It has been found desirable and necessary to precondition and treat gas streams prior to filtration. For example, flue gas streams with acid gases may damage and reduce the effectiveness of equipment and the acid gases are preferably removed or treated in the gas stream prior to and during filtration. By law, current codes require high efficiency removal of acid gases. One object of the present invention is to comply with environmental laws to remove acid gases, such as HCl and $SO_2$, from flue gas streams prior to and during filtration, specifically as in the dry scrubber assembly of the invention.

As further discussed herein, a dry scrubber assembly utilizes the filter or dust cake that forms on the bags used during filtration. A filter or dust cake is the concentrated solid or semisolid material separated from the gas stream and which remains on the filter surface after filtration. The dry scrubber assembly of the present invention uses known cleaning methods to clean the filter cake from the filter bags in a partial and controlled manner. One such known and common method to remove dust cake from the bags is to pneumatically flex the bag with a quick, jet blast of air known as pulse jet bag cleaning and which is used to control the filter cake thickness. The method particularly relates to this invention and is accomplished by delivering a burst of compressed air into a venturi throat located in the clean-air plenum which directs the burst of air into the mouth of the bag, causing the bag to flex outwardly and dislodge the dust cake. In operation, the bags are cleaned in rows on a pre-selected cleaning cycle. The dislodged cake falls into the hopper and is removed from the baghouse by a screw conveyor.

The control of the filter cake thickness essentially controls the effectiveness of active reagent. Another object of the invention is to provide a baghouse cleaning method and to control the filter cake accumulated on the bag surfaces. The filter cake management system of the invention controls the filter cake on the bag surfaces to effectively deal with any acid gases remaining in the flue gas stream.

SUMMARY OF THE INVENTION

The present invention provides an air pollution control assembly and method which relates to the treatment and removal of pollutants from gas streams. Specifically, the invention relates to an air pollution control assembly to treat flue gas streams having acid gases and other pollutants. The assembly may comprise an evaporative cooler and/or spray dryer gas distribution system used to treat a gaseous stream to improve the removal of matter in air pollution control equipment. The assembly further provides a reagent injection venturi to treat a gaseous stream having an acidic gas content. The assembly and method also comprises a baghouse assembly and a filter cake management system which enhance the removal of reactive and absorbable pollutants.

The object of this invention is to effectively and efficiently remove pollutants from gas streams, and particularly flue gas streams having acid gases. The evaporative cooler and spray dryer gas stream distribution system, the reagent injection venturi assembly, baghouse assembly and filter cake management system may be individually utilized or may be used in combination with each other depending upon the nature of the flue gas streams to be treated. For example, in one embodiment of the air pollution control assembly the object is to provide a dry scrubber assembly comprising a reagent injection venturi assembly and a baghouse assembly having a filtercake management system.

These and other benefits of this invention will become clear from the following description by reference to the drawings.

DESCRIPTION OF THE DRAWINGS

FIG. 5 is a lateral plan view of the injection venturi assembly of the air pollution control equipment of the present invention;

FIG. 6 is a top plan view of the assembly of FIG. 5;

FIG. 7 is a front plan view of the baghouse assembly of the invention;

FIG. 8 is a lateral plan view of the baghouse assembly of FIG. 7;

FIG. 9 is a sectional view of the baghouse assembly of FIG. 8 and taken along line 9—9;

FIG. 10 is a sectional view of the baghouse assembly of FIG. 9 and taken along line 10—10;

FIG. 11 is a top plan view of the tube sheet used in the baghouse assembly of FIG. 7.

DESCRIPTION OF THE PREFERRED EMBODIMENTS

The present invention relates to air pollution control assemblies and methods and particularly to various air pollution control systems to treat gas streams to effectively and efficiently remove pollutants. The air pollution control assemblies are particularly adapted to remove acid gases from flue streams, such as those created in incinerators and the like. The assemblies of the invention involve several systems which are discussed below and these systems may include an evaporative cooler and/or spray dryer gas distribution system, a reagent injection venturi assembly, and a baghouse assembly having a filter cake management system. These systems may be used in combination to form various air pollution control assemblies. For example, as will be further discussed below, a dry scrubber assembly may be formed using a reagent injection venturi in combination with a baghouse assembly having a filter cake management system.

Figure 12:
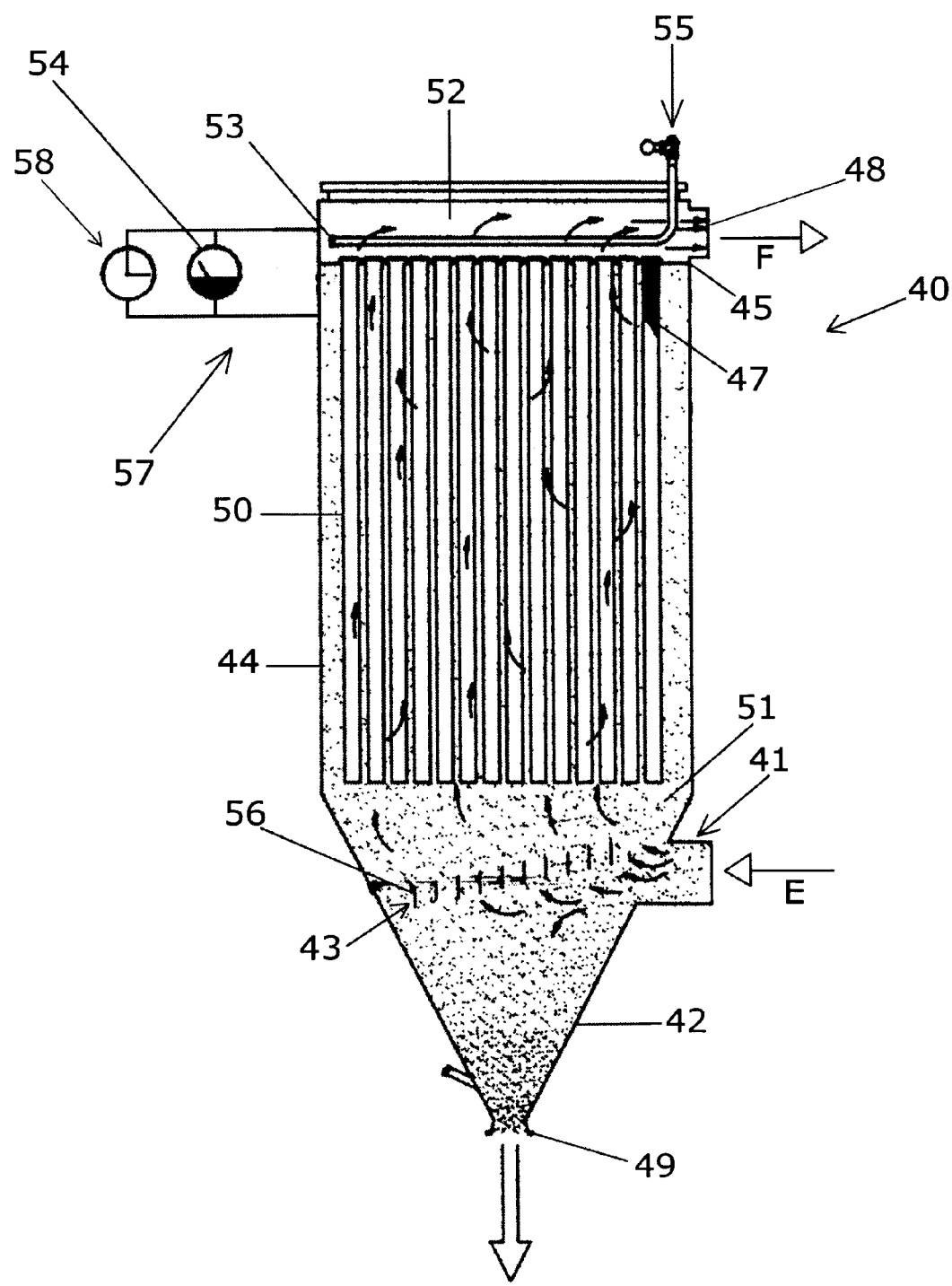
FIG. 12 is lateral plan view of the ash removal system of the air pollution control equipment of the present invention.

The dry scrubber assembly of the present invention may be formed by cooperating assemblies to treat and condition flue gas streams. For example, a dry scrubber system may be formed by combining a reagent injection venturi assembly 30, as shown in FIGS. 5–6, and a reaction vessel comprising a baghouse assembly 40 having a filter cake management system 57, as shown in FIGS. 7 and 12. Referring to the reagent injection venturi assembly 30 of FIGS. 5–6, flue gas Stream C is mixed with reagent at the converging section 32 of the venturi assembly 30 and exits as treated Stream D. Stream D, which is a treated flue gas and reagent mixture, then travels to the baghouse assembly 40 shown in FIGS. 7, 8 and 12, and enters as treated Stream E. Within the baghouse assembly 40, Stream E is guided upwards by the vertically positioned members 56 of the gas distribution assembly 43 and into the filter bags 50 having a thickness of filter cake which is controlled by filter cake management system 57. The gas Stream E is thus further reacted and treated and exits the reaction vessel or baghouse assembly 40 as clean gas stream F.

An evaporative cooler may also be combined with the above described assembly to form another embodiment of the air pollution control assembly. As shown in FIGS. 1–4, an untreated flue gas Stream A enters evaporative cooler 10. The gas is cooled therein and exits the evaporative cooler 10 as conditioned gas stream B. Stream B may then travel to the reagent injection venturi 30 and enters as flue gas Stream C, shown in FIG. 6.

Figure 1:
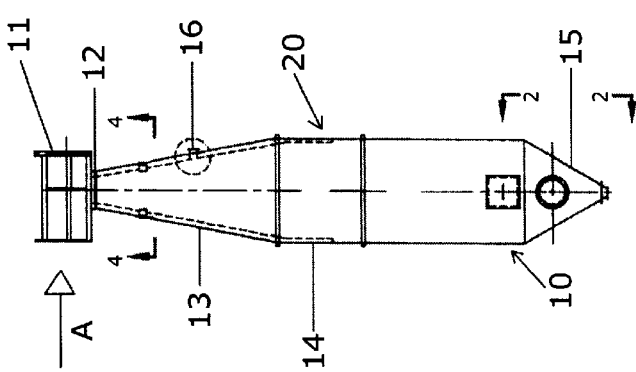
FIG. 1 is a lateral plan view of the evaporative cooler assembly of the air pollution control equipment of the present invention.

Referring to FIGS. 1–4, the evaporative cooler gas distribution system or evaporative cooler 10 is there shown. As shown in FIG. 1, the evaporative cooler gas distribution system 10 is comprised of an inlet plenum 11, an inlet orifice 12, fluid distribution system 16, a diverging inlet section 13, a straight section 14 and a hopper section 15. The latter elements comprise the vessel 20.

Figure 3:
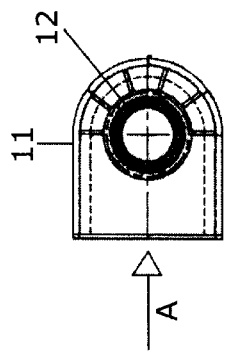
FIG. 3 is a sectional view of the nozzle assembly of the evaporative cooler assembly of FIG. 1.

In an evaporative cooler as shown in FIG. 1, water and air are injected by fluid distribution system 16 which is comprised of a plurality of spray lances having the water injectors 17 and air injectors 18 therein, to cool the gas stream to make it compatible with downstream air pollution control equipment, such as the reagent injection venturi 30 shown in FIGS. 5–6 and baghouse filtration assembly 40 shown in FIGS. 7–12. As shown, the fluid distribution system 16 is placed in the inlet section 13 of vessel 20. The spray lances include the piping and nozzles connected to injectors 17 and 18 as shown in FIG. 3. The spray lances protrude into vessel 20 and are constructed and arranged to uniformly disburse fluid into the gas stream. Evaporative coolers and spray dryers are similar devices and the device features may be combined in the fluid distribution system 16 or alternatively, the spray dryer may be located downstream from system 16. In a spray dryer (not shown), a slurry of a reagent, water and air are injected into the vessel 20 to cool the gas stream, and to cause a reaction between the reagent and acid gases in the flue gas stream. Hydrated lime, sodium bicarbonate or other reactive chemicals, for example, may be used as reagents to treat multiple pollutants, including heavy metals, for example. The reagents may be injected through the water injectors or may be separately introduced in the center of the vessel 20.

In both evaporative coolers and spray dryers as in other flue gas cooling assemblies or cooling means, it is imperative that all of the liquid be completely evaporated in the vessel 20 to prevent fouling of the air pollution control equipment, and it is also necessary that the flue gas is uniformly treated to preclude stratified temperature regions or unreacted acid gas. Therefore, the flue gases are evenly distributed across the vessel, with uniform flow that is parallel to the vessel walls. The distribution is done as quickly as possible, and generally must be done while the flue gas makes a 90° turn while entering the vessel. Furthermore, the quality of the gas distribution must be maintained while the gas flow varies by as much as 30%. Because the gas temperature may be 2000° F. or more, it is not practical to use internal gas distribution means, such as turning vanes. As is known, other flue gas cooling means may be used to cool such elevated flue gas temperature.

Figure 4:
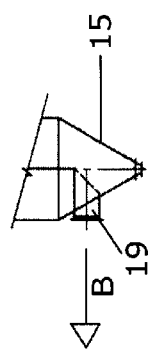
FIG. 4 is a sectional view of the assembly of FIG. 1 taken along line 4—4.

The present invention relates to a system for distributing water having a fluid distribution system 16 at the inlet to the evaporative cooling/spray drying vessel 20 that meets the above described requirements. As shown in FIGS. 1 and 4, the flue gas stream A enters a plenum 11 where the gas velocity is reduced. An orifice 12 forms an opening into vessel 20 and is located at 90 degrees to the inlet gas flow. This orifice 12 creates a sufficient pressure drop between inlet plenum 11 and vessel 20 to throttle the gas flow and cause the flow pattern to be dictated by pressure relief rather than inertia. Therefore, the gas flows from plenum 11 through orifice 12 with uniform distribution over the cross sectional area.

Figure 2:
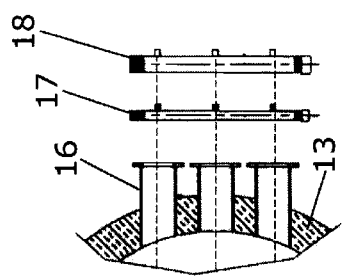
FIG. 2 is a lateral view of the assembly of FIG. 1 taken along line 2—2.

The cooling/spray drying vessel 20 has walls defining a diverging inlet section 13, that flare outward at a nominal included angle of 15 degrees, which is generally equal to the natural expansion of a gas. Water is then injected, preferably uniformly, into the gas by means of distribution system 16 comprised of at least one injector located in the side wall of diverging inlet section 13, as further shown in FIG. 3. The vessel 20 may also have at least a reagent slurry injector assembly located below the water injector, for applying reagent while cooling the gas stream. The fluid distribution system 16 preferably has water injectors 17 and air injectors 18. The air injectors are used to atomize the water particles allowing them to combine with the gas particles in the stream to effectively cool the gas particles. Preferably, the water/air and or reagent injectors are centrally positioned in the vessel to cocurrently introduce the fluids with the flue gas flow. For example, a pattern of a plurality, i.e., 3 or 4 injectors may be used. The diverging inlet section 13 opens into a straight section 14 further allowing the gas to expand and cool. The gas then enters a converging hopper section 15 where heavier particles fall into the bottom of hopper 15 and lighter particles continue through the air filtration system by exiting the vessel 20 through flue gas outlet 19 as gas stream B, as shown in FIG. 2.

Referring to FIGS. 5 and 6, the reagent injection venturi assembly 30 of the present invention is there shown. To achieve a high acid gas removal efficiency, it is necessary that the reagent that is injected be uniformly distributed across the gas stream, so that contact is made with all of the acid gases and pollutants generated in the incinerator. This distribution must be effective, regardless of normal fluctuations in the gas volume (30% typically). Furthermore, since reagents and reactants are often self adherent and subject to build-up, in order to operate reliably, the gas distribution device must cause smooth flow lines and require that a minimum amount of equipment be located in the gas stream.

The present invention relates to a system comprised of several baghouse features that collectively accomplish the above described requirements. The system of this invention consists of a gas distribution device or assembly (ladder vane baffle) 43 that is located in the hopper 42 of baghouse 40 as the gas enters from horizontal hopper inlet 41. This device in effect functions as a series of turning vanes to direct the gas and reagent flow from inlet 41 and to distribute it upwardly and evenly throughout dirty gas chamber 51. The assembly 43 is arranged to minimize the amount of reagent that is knocked out of the gas stream, and also has no flat horizontal surfaces for material build-up. The baghouse sizing, bag spacing, and bag length to diameter ratio are all established so that the upward gas velocity between the bags 50 is such that larger particles can fall against the gas flow and reach the hopper 42 for removal, while smaller, less dense particles are retained and deposited back on bags 50. This is significant because as particles reside in the baghouse and react with the acid gases, they tend to agglomerate and grow. These aged particles have reacted and are of no further benefit so their removal is desirable. On the other hand, the smaller particles tend to be new, fresh reagent, and it is beneficial for them to be retained and remain as a part of the filter cake for continued reaction.

Referring particularly to FIGS. 9, 10 and 12, the gas distribution assembly 43 is shown in the hopper section 42 of the baghouse or reaction vessel 40. The gas distribution assembly 43 is shown disposed upwardly at an angle with respect to inlet 41. The assembly is further shown to be comprised of a plurality of vertically positioned members 56 which are horizontally and vertically spaced from one another to thereby form the angularly positioned assembly 43. The treated flue gas stream, therefore, enters the reaction vessel 40 through inlet 41 and flow is directed upwardly by means of the vertically positioned members 56 of the assembly 43.

Referring to FIGS. 7 and 12, the filter cake management system 57 of the present invention is implemented in a baghouse filtration assembly 40 to form a reaction vessel. Generally, the flue gas stream E enters the baghouse assembly 40 through horizontally disposed hopper inlet 41, preferably located in the side wall of hopper 42 and as particularly shown in FIGS. 7, 8, 10 and 12. Inside the assembly 40, heavier particles fall into hopper 42 for removal at outlet 49, while lighter particles travel upward through dirty gas chamber 51 and are filtered by filter bags 50. The bags 50, preferably are disposed around the exterior of filter tube cages 47 which are preferably hanging down from a filter tube sheet 45 within housing section 44, as shown in FIG. 12. As shown in FIG. 11, the tube sheet 45 is supported by tube sheet support members 46 attached to housing section 44. Once the gas is filtered by filter bags 50, the gas travels through clean gas plenum 52 and clean gas stream F exits out the clean gas outlet 48.

The accumulation of particulate on the surface of a filter bag in a baghouse filtration assembly 40 as shown in FIGS. 7, 8, and 12 is referred to as the "filter cake." This cake has long been recognized as being an important aid in effective filtration of particulate. In the case of a dry scrubber system where a reagent is injected into the gas steam to react with acid gasses, it performs an additional function. Because the gas flow is relatively slow as it passes through the filter cake, and contact is intimate with the reagent, it is a critical component of the acid gas scrubbing program.

In order to maximize the filter cake's effectiveness, it is important to accomplish several things simultaneously: a reasonably thick cake should be retained (but not enough to unduly impede gas flow); the reacted material in the filter cake needs to be removed periodically; the unreacted material needs to be retained and replenished; the proper density of the filter cake needs to be continuously maintained; and all of these conditions must occur equally on all bags and throughout the length of every bag.

The present invention relates to a system comprised of several baghouse features that collectively accomplish the above described requirements. The system of this invention consists of a gas distribution device or assembly (ladder vane baffle) 43 that is located in the hopper 42 of baghouse 40 as the gas enters from horizontally disposed hopper inlet 41. This distribution device or assembly 43 in effect functions as a series of turning vanes or vertically positioned members 56 to direct the gas and reagent flow from inlet 41 and to distribute it upwardly and evenly throughout dirty gas chamber 51. The assembly 43 is arranged to minimize the amount of reagent that is knocked out of the gas stream E, and also has no flat horizontal surfaces for material build-up. The baghouse sizing, bag spacing, and bag length to diameter ratio are all established so that the upward gas velocity between the bags 50 is such that larger particles can fall against the gas flow and reach the hopper 42 for removal, while smaller, less dense particles are retained and deposited back on bags 50. This is significant because as particles reside in the baghouse and react with the acid gases, they tend to agglomerate and grow. These aged particles have reacted and are of no further benefit, so their removal is desirable. On the other hand, the smaller particles tend to be new, fresh reagent, and it is beneficial for them to be retained and remain as a part of the filter cake for continued reaction.

Referring particularly to FIGS. 9, 10 and 12, the gas distribution assembly 43 is shown in the hopper section 42 of the baghouse or reaction vessel 40. The gas distribution assembly 43 is shown disposed upwardly at an angle with respect to inlet 41.

The assembly is further shown to be comprised of a plurality of vertically positioned members 56 which are horizontally and vertically spaced from one another to thereby form the angularly positioned assembly 43. The treated flue gas stream E, therefore, enters the reaction vessel 40 through inlet 41 and flow is directed upwardly by means of the vertically positioned members 56 of the assembly 43.

The bags 50 are cleaned automatically to prevent the baghouse 40 from becoming clogged, as further discussed below. The cleaning methodology is critical to maintaining the effectiveness of the acid gas reaction in the filter cake. If bags 50 are cleaned too often or too effectively, there will be a period when there is an insufficient amount of reagent in the filter cake for maximum effectiveness. If bags 50 are not cleaned often enough, the reagent in the inner part of the filter cake reacts with the gas and becomes ineffective, while new reagent that is added to the outside of the filter cake will often shed or flake off before it has a chance to react. These problems are solved by initiating bag cleaning automatically by two different parameters. A differential pressure sensor 54 monitors the differential pressure across the system and will initiate cleaning when bags 50 have accumulated a sufficient amount of material that it impedes flow, which also is related to the amount of pollutants that the system has handled. If the pressure differential has not initiated bag cleaning in a preset period, a timer 58 will instead initiate the cleaning. This prevents the system from going too long without rejuvenating the filter cake. Also, only a fraction of bags 50 are cleaned with each initiation so the entire filter cake is never removed in a single cleaning episode. For example, selected rows or bags are cleaned at a time by a pulse jet to control filter cake build up thickness. The timer, pressure differential, and number of bags cleaned are all determined individually on each project based on experience and the specific operating parameters.

The invention also utilizes control ladder logistics that provides an electrical description relating to the process used in the monitoring and operation of the bag cleaning system of this invention. A computerized system may be provided to control the operation of water pumps, fans, valves, temperature controls, timers, alarms, etc. which are used in the assembly of this invention.

When the differential pressure sensor 54 or the timer indicate that the bag filters need to be cleaned, the normal baghouse filtration operation may continue to run or may be interrupted allowing the pressure differential to fall to make the removal of particulate from the filters easier. Air is pulsed into a predetermined percentage of the bag filters within the baghouse 40 to blow the loosened particulate from the filters. Preferably, a compressed air injector or blowpipe 53 connected to a compressed air source 55 is aligned with each row of filter bags 50 or another preselected number of bags. The selected bags are pulsed to jar the loosened material reducing the thickness of the filter cake on the selected bags.

The removed particulate falls from the filter bags into the hopper 42. The hopper 42 is then cleaned by a screw conveyor ash removal system connected at the hopper outlet 49. As the particulate is being removed, the hopper 42 is preferably vibrated to ensure that the maximum amount of particulate is removed.

Fresh reagent is applied to the filter bags by the flue gas having reagents previously injected into the flue gas stream, for example by a reagent injection venturi as previously discussed. In summary, the cleaning process includes pulsing the individual rows of bags to dislodge filter cake, settling of the dislodged material into the hopper for removal, and reestablishment of a reactive filter cake.

As many changes are possible to the embodiments of this invention utilizing the teachings thereof, the description above, and the accompanying drawings should be interpreted in the illustrative and not the limited sense.

That which is claimed is:

1. A dry scrubber assembly for treating a flue gas stream comprising:
   a) an evaporative cooler assembly including a vessel having a wall and an inlet and wherein said inlet is constructed and arranged to direct the flow of said flue gas approximately 90 degrees whereby said flue gas is directed generally parallel to said vessel wall and evenly distributed across said vessel;
   b) a reagent injection venturi assembly in communication with said evaporative cooler assembly and having converging and diverging sections and having means constructed and arranged to inject a reagent generally cocurrent with said flue gas stream in said converging section of said venturi assembly to thereby produce a first treated flue gas stream having said reagent evenly distributed and reacting therein; said means to inject including an injector assembly for spraying a reagent into said flue gas stream to react with acid gases in said flue gas stream;
   c) a baghouse assembly providing a reagent reaction vessel, said baghouse assembly comprising a generally vertically disposed housing with a tapered bottom section, said bottom section further having a generally horizontal inlet constructed and arranged to receive said first treated flue gas stream, said housing having a gas stream directing and distribution assembly positioned within said tapered bottom section and being in general alignment with said baghouse assembly inlet to uniformly distribute said first treated flue gas upward and throughout said housing of said baghouse assembly, said gas distribution assembly being disposed at an angle with respect to said horizontal inlet and further comprising a plurality of spaced parallel and vertically disposed members, said baghouse assembly further having a plurality of filter bags positioned above said gas stream distribution assembly, each said filter bag having a surface for forming a filter cake material on said surface of each said filter bag; and
   d) a filter cake management system to control the reaction in said reaction vessel, said filter cake management system having means to control and remove said filter cake material from said filter bag surfaces and further having means to activate partial removal of filter cake from said baghouse assembly.

2. The dry scrubber assembly of claim 1, wherein said evaporative cooler vessel inlet includes a gas distribution system comprising a plenum having an orifice disposed approximately 90 degrees with respect to the plenum inlet flow.

3. The dry scrubber assembly of claim 1, wherein said evaporative cooler assembly includes a water and air injector and a reagent injector.

4. The dry scrubber assembly of claim 1, wherein said evaporative cooler vessel wall slopes outwardly from said inlet at a cross-sectional angle of approximately 15 degrees.

5. The dry scrubber assembly of claim 1, wherein said reagent injection venturi assembly includes a reagent pipe having an end positioned generally centrally said flue gas stream at said converging section whereby reagent is injected cocurrent with said flue gas stream.

6. The dry scrubber assembly of claim 1, wherein said gas stream directing and distribution assembly of said baghouse assembly is a ladder vane baffle device.

7. The dry scrubber assembly of claim 1, wherein said filter cake management system includes means to measure pressure differential in said baghouse assembly.

8. The dry scrubber assembly of claim 7, wherein said filter cake management system includes a timer to initiate bag cleaning.

9. A dry scrubber assembly for treating a flue gas stream comprising:
   a) a flue gas cooling assembly to provide cooled flue gas stream;
   b) a reagent injection venturi assembly in communication with said flue gas cooling assembly, said reagent injection venturi assembly having converging and diverging sections and wherein a reagent injector is positioned at said converging section, said reagent injector including a reagent pipe having an end positioned generally centrally of said cooled flue gas stream at said converging section whereby reagent is injected generally cocurrent with said cooled flue gas stream and wherein a first treated flue gas stream exits said venturi assembly;
   c) a reaction vessel bag-house assembly for continuing the reaction between said first treated flue gas stream and said reagent and having an inlet for receiving said first treated flue gas stream and a gas distribution assembly positioned at an angle with respect to said baghouse inlet for evenly distributing said first treated flue gas in said reaction vessel baghouse assembly, said gas distribution assembly being comprised of a plurality of individual members which are serially spaced and vertically disposed, said reaction vessel bag-house assembly comprising a plurality of filter bags, each said filter bag having a surface for the accumulation of filter cake; and
   d) a filter cake management system including means to measure pressure differential across said filter bags in said reaction vessel bag-house assembly, wherein said filter cake management system further has means to initiate the removal of a portion of the filter cake accumulated on said filter bag surfaces.

10. The dry scrubber assembly of claim 9, wherein said reagent injector is in communication with a reagent source for reacting with acid gases in said flue gas stream.

11. The dry scrubber assembly of claim 9, wherein said gas distribution assembly of said bag-house assembly is a ladder vane baffle device comprising a plurality of horizontally disposed members to evenly distribute said first treated flue gas in said baghouse assembly.

12. The dry scrubber assembly of claim 11, wherein said means to initiate removal of said filter cake management system includes a timer and a pressure differential measuring means to initiate bag cleaning.

13. A dry scrubber assembly for treating a gas stream comprising:
   a) means to cool said gas stream;
   b) a reagent injection venturi comprised of at least one wall and having a central axis therethrough, said venturi comprised of a gas flow inlet wherein said at least one wall tapers inward toward said central axis to form a converging section, said at least one wall tapering to become aligned parallel with said central axis forming a straight section and said at least one wall then tapering outward away from said central axis to form a diverging section, said venturi having a reagent injection means positioned in said converging section to introduce a reagent generally cocurrent to said cooled gas stream and to distribute said reagent uniformly in said cooled gas stream thereby producing a first treated gas stream; and
   c) a reaction vessel having a filter cake management system, said reaction vessel comprised of a gas flow inlet at the bottom thereof and being in communication with and constructed and arranged to receive said first treated gas stream from said reagent injection venturi and having at least one wall and having a gas distribution device extending angularly with respect to said gas flow inlet and extending across the interior of said reaction vessel and comprising serially spaced and vertically disposed baffle members to evenly distribute said first treated gas stream in said reaction vessel, a clean air plenum and a dirty air plenum separated by a plurality of filter bags, a bag cleaning mechanism having a means to monitor a pressure differential between the pressure inside the filter bags and outside the filter bags, said means to monitor pressure differential triggers the initiation of cleaning only a portion of the filter bags when said means to monitor pressure differential indicates that flow is being impeded, said bag cleaning mechanism further comprising a timer that initiates cleaning if said means to monitor pressure differential has not initiated cleaning within a specified time period.

14. A dry scrubber assembly for treating and removing pollutants from a gas stream comprising:
   a) a gas stream;
   b) an evaporative cooler assembly including a vessel having a wall and an inlet and wherein said inlet is constructed and arranged to direct the flow of said gas stream approximately 90 degrees whereby said gas stream is directed generally parallel to said vessel wall and evenly distributed across said vessel;
   c) a venturi assembly in communication with said evaporative cooler assembly and having at least one reagent nozzle assembly constructed and arranged to treat said gas stream and to distribute reagent uniformly therein to thereby create a first treated gas stream;
   d) a reaction vessel for continuing the reaction between pollutants in said first treated gas stream and said reagent, said reaction vessel having a plurality of first treated gas stream filtering assemblies having surfaces for producing filter cake deposits through which said first treated gas stream flows and reacts, said filter cake deposits having a thickness; and
   e) means to control said thickness of said filter cake deposits using a specified time period and the pressure differential across said filter cake deposits in said reaction vessel.

15. The dry scrubber assembly of claim 14, wherein said first treated gas stream filtering assemblies include fabric filter bags having flexible surfaces and wherein said filter bags are disposed in a series of rows.

16. The dry scrubber assembly of claim 15, wherein said means to control said filter cake deposits include air pressure jets cooperating with each said filter bag, a timer and a pressure differential sensing device.

* * * * *